US008488903B2

(12) United States Patent
Higuchi

(10) Patent No.: US 8,488,903 B2
(45) Date of Patent: Jul. 16, 2013

(54) IMAGE PROCESSING DEVICE AND INFORMATION STORAGE MEDIUM

(75) Inventor: Keiji Higuchi, Kunitachi (JP)

(73) Assignee: Olympus Corporation, Tokyo (JP)

( * ) Notice: Subject to any disclaimer, the term of this patent is extended or adjusted under 35 U.S.C. 154(b) by 218 days.

(21) Appl. No.: 13/165,072

(22) Filed: Jun. 21, 2011

(65) Prior Publication Data

US 2011/0311117 A1 Dec. 22, 2011

(30) Foreign Application Priority Data

Jun. 21, 2010 (JP) .................... 2010-140434

(51) Int. Cl.
*G06K 9/40* (2006.01)
*G06K 9/00* (2006.01)

(52) U.S. Cl.
USPC .......................................... 382/274; 382/128

(58) Field of Classification Search
USPC ......... 382/128, 162, 167, 191, 260, 274–275, 382/284, 305, 312; 600/101; 348/45
See application file for complete search history.

(56) References Cited

U.S. PATENT DOCUMENTS

| 7,393,321 | B2 * | 7/2008 | Doguchi et al. | 600/109 |
| 8,231,522 | B2 * | 7/2012 | Endo et al. | 600/109 |
| 8,305,427 | B2 * | 11/2012 | Yamazaki et al. | 348/46 |
| 2001/0052938 | A1 | 12/2001 | Itoh | |
| 2007/0153542 | A1 | 7/2007 | Gono et al. | |
| 2010/0295975 | A1 | 11/2010 | Higuchi | |

FOREIGN PATENT DOCUMENTS

| JP | 2002-010274 | 1/2002 |
| JP | 2006-068113 | 3/2006 |
| JP | 2007-053439 | 3/2007 |
| JP | 2009-188822 | 8/2009 |

* cited by examiner

*Primary Examiner* — Kanjibhai Patel
(74) *Attorney, Agent, or Firm* — Scully, Scott, Murphy & Presser, P.C.

(57) ABSTRACT

An image processing device includes a normal light image acquisition section that acquires a normal light image including an object image that includes information within a wavelength band of white light, a special light image acquisition section that acquires a special light image including an object image that includes information within a specific wavelength band, an isolated point determination section that performs an isolated point determination process on a normal light processing target pixel based on a pixel value of the normal light processing target pixel, the normal light processing target pixel being a processing target pixel included in the normal light image, and a correction control section that controls a correction process performed on the special light image based on the isolated point determination process performed by the isolated point determination section.

32 Claims, 13 Drawing Sheets

FIG. 1A FIRST EMBODIMENT
ISOLATED POINT DETERMINATION: NORMAL LIGHT
(DETERMINATION AS TO WHETHER OR NOT
PROCESSING TARGET PIXEL IS ISOLATED POINT)
PRESUMPTION SECTION IS NOT PROVIDED

| NORMAL LIGHT | SPECIAL LIGHT | |  |
|---|---|---|---|
| ⊓ | ⊓ | CORRECTION IS REQUIRED | ← A2 |
| ⊓ | — | CORRECTION IS REQUIRED | |
| — | ⊓ | CORRECTION IS NOT REQUIRED | ← A1 |
| — | — | CORRECTION IS NOT REQUIRED | |

FIG. 1B MODIFICATION
ISOLATED POINT DETERMINATION:
NORMAL LIGHT + SPECIAL LIGHT
PRESUMPTION SECTION IS NOT PROVIDED

| NORMAL LIGHT | SPECIAL LIGHT | |  |
|---|---|---|---|
| ⊓ | ⊓ | CORRECTION IS REQUIRED | ← B2 |
| ⊓ | — | CORRECTION IS NOT REQUIRED | |
| — | ⊓ | CORRECTION IS NOT REQUIRED | ← B1 |
| — | — | CORRECTION IS NOT REQUIRED | |

FIG. 1C SECOND EMBODIMENT
ISOLATED POINT DETERMINATION:
NORMAL LIGHT (DETERMINATION OF DEGREE OF ISOLATION)
PRESUMPTION SECTION IS NOT PROVIDED

FIG. 1D MODIFICATION
ISOLATED POINT DETERMINATION:
NORMAL LIGHT + SPECIAL LIGHT
PRESUMPTION SECTION IS NOT PROVIDED

FIG. 2

THIRD EMBODIMENT
ISOLATED POINT DETERMINATION: NORMAL LIGHT + SPECIAL LIGHT
PRESUMPTION SECTION IS PROVIDED

|  | NORMAL LIGHT | SPECIAL LIGHT | IMAGING ELEMENT | GAIN-UP PROCESS | OBJECT |
|---|---|---|---|---|---|
| C1 → | ⊓ | ⊓ | CORRECTION IS REQUIRED | CORRECTION IS REQUIRED | CORRECTION IS REQUIRED |
| C2 → | ⊓ | — | CORRECTION IS REQUIRED | CORRECTION IS NOT REQUIRED | CORRECTION IS NOT REQUIRED |
| C3 → | — | ⊓ | CORRECTION IS REQUIRED | CORRECTION IS REQUIRED | CORRECTION IS NOT REQUIRED |
| C4 → | — | — | CORRECTION IS REQUIRED | CORRECTION IS NOT REQUIRED | CORRECTION IS NOT REQUIRED |

IMAGE PROCESSING DEVICE AND INFORMATION STORAGE MEDIUM

Japanese Patent Application No. 2010-140434 filed on Jun. 21, 2010, is hereby incorporated by reference in its entirety.

BACKGROUND

The present invention relates to an image processing device, an information storage medium, and the like.

A median filter or the like has been widely used to correct an isolated point of an image. A method that determines an isolated point by comparing the average value or the median value of the pixels values of pixels positioned around the processing target pixel with a given threshold value has been known.

For example, JP-A-2002-10274 discloses a method that determines whether or not the processing target pixel is an isolated point by calculating the average value of the pixel values of pixels positioned around the processing target pixel (in the diagonal direction), and comparing the average value with the pixel value of each pixel and a threshold value.

A frame-sequential endoscope system that sequentially applies three colors of light (RGB) to the tissue in a body cavity using a rotary filter, and allows diagnosis using an image (normal light image) generated from the resulting reflected light images, has been widely used. JP-A-2006-68113 discloses an endoscope system that sequentially applies narrow-band light G2 and narrow-band light B2 that differ from the above three colors of light to the tissue in a body cavity, and allows diagnosis using a narrow-band light image (special light image) generated from the resulting reflected light images.

SUMMARY

According to one aspect of the invention, there is provided an image processing device comprising:

a normal light image acquisition section that acquires a normal light image including an object image that includes information within a wavelength band of white light;

a special light image acquisition section that acquires a special light image including an object image that includes information within a specific wavelength band;

an isolated point determination section that performs an isolated point determination process on a normal light processing target pixel based on a pixel value of the normal light processing target pixel, the normal light processing target pixel being a processing target pixel included in the normal light image; and a correction control section that controls a correction process performed on the special light image based on the isolated point determination process performed by the isolated point determination section.

According to another aspect of the invention, there is provided an information storage medium storing a program that causes a computer to function as:

a normal light image acquisition section that acquires a normal light image including an object image that includes information within a wavelength band of white light;

a special light image acquisition section that acquires a special light image including an object image that includes information within a specific wavelength band;

an isolated point determination section that performs an isolated point determination process on a normal light processing target pixel based on a pixel value of the normal light processing target pixel, the normal light processing target pixel being a processing target pixel included in the normal light image; and a correction control section that controls a correction process performed on the special light image based on the isolated point determination process performed by the isolated point determination section.

BRIEF DESCRIPTION OF THE DRAWINGS

FIGS. 1A and 1B are views illustrative of a process according to a first embodiment and a modification thereof, and FIGS. 1C and 1D are views illustrative of a process according to a second embodiment and a modification thereof FIG. 2 is a view illustrative of a process according to a third embodiment.

DESCRIPTION OF EXEMPLARY EMBODIMENTS

Figure 3:
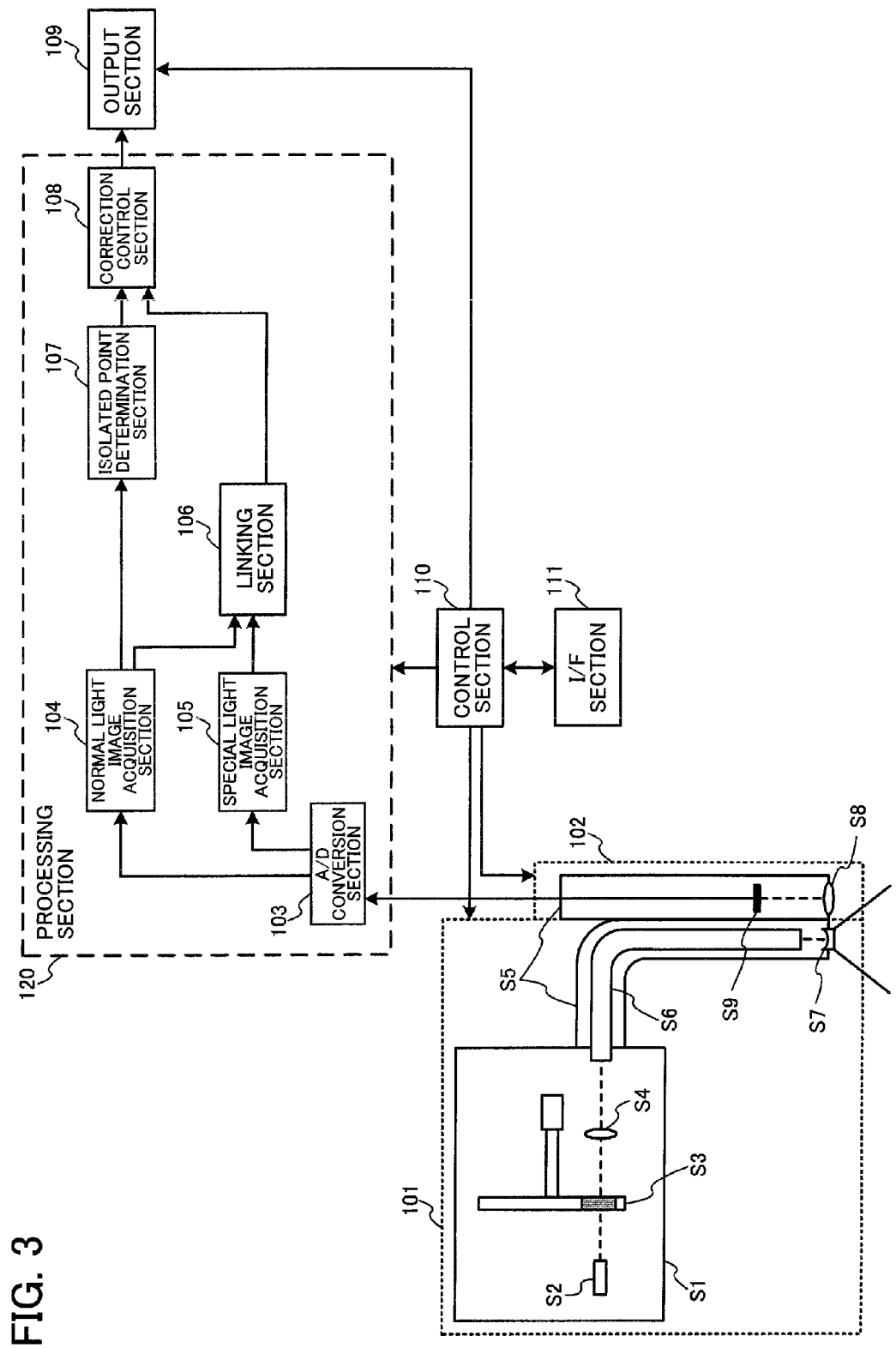
FIG. 3 shows a configuration example of an endoscope system that includes an image processing device according to one embodiment of the invention.

Several aspects of the invention may provide an image processing device, a program, and the like that implement a highly accurate isolated point correction process by determining an isolated point based on a special light image and the corresponding normal light image.

Several aspects of the invention may provide an image processing device, a program, and the like that perform an appropriate isolated point correction process by calculating the degree of isolation based on a normal light image, and blending the pixel value of the processing target pixel with the corrected value based on the degree of isolation.

According to one embodiment of the invention, there is provided an image processing device comprising:

a normal light image acquisition section that acquires a normal light image including an object image that includes information within a wavelength band of white light;

a special light image acquisition section that acquires a special light image including an object image that includes information within a specific wavelength band;

an isolated point determination section that performs an isolated point determination process on a normal light processing target pixel based on a pixel value of the normal light processing target pixel, the normal light processing target pixel being a processing target pixel included in the normal light image; and a correction control section that controls a correction process performed on the special light image based on the isolated point determination process performed by the isolated point determination section.

According to the above embodiment, the normal light image and the special light image are acquired, and the isolated point determination process is performed based on the pixel value of the normal light image to control the correction process performed on the special light image. This makes it possible to prevent a situation in which the original component of the object is corrected, and provide a special light image so that the information is omitted to no or only a small extent.

According to another embodiment of the invention, there is provided an information storage medium storing a program that causes a computer to function as:

a normal light image acquisition section that acquires a normal light image including an object image that includes information within a wavelength band of white light;

a special light image acquisition section that acquires a special light image including an object image that includes information within a specific wavelength band;

an isolated point determination section that performs an isolated point determination process on a normal light processing target pixel based on a pixel value of the normal light processing target pixel, the normal light processing target pixel being a processing target pixel included in the normal light image; and a correction control section that controls a correction process performed on the special light image based on the isolated point determination process performed by the isolated point determination section.

Exemplary embodiments of the invention are described below. Note that the following exemplary embodiments do not in any way limit the scope of the invention laid out in the claims. Note that all of the elements of the following exemplary embodiments should not necessarily be taken as essential elements of the invention.

1. Method

A method employed in several embodiments of the invention is described below. In the field of image processing, a pixel having a pixel value that significantly differs from the pixel values of the peripheral pixels is referred to as an isolated point. The isolated point is normally corrected using a median filter or the like.

An endoscope system that utilizes normal light and special light normally uses information about the special light image when performing an isolated point correction process on the special light image. According to this method, however, when the original component of the object significantly differs from the peripheral pixels, the original component of the object that should be allowed to remain may be corrected.

The present application proposes a method that corrects an isolated point included in the special light image using the information about the normal light image. According to this method, it is possible to maintain a point that is not determined to be an isolated point when using the normal light image, but is determined to be an isolated point when using the special light image (see A1 in FIG. 1A). A pixel such as that indicated by A2 is corrected since it is likely that the pixel is an isolated point that requires correction. In FIGS. 1A and 1B, a convex figure indicates that the pixel has been determined to be an isolated point, and a flat figure indicates that the pixel has not been determined to be an isolated point. FIG. 1A shows four patterns depending on whether or not the normal light image/special light image includes an isolated point. When determining an isolated point using only the normal light image, the two patterns on the upper side or the lower side cannot be distinguished from each other.

An isolated point may be determined using the information about the special light image in addition to the information about the normal light image. This makes it possible to correct a point that has been determined to be an isolated point using the normal light image and the special light image (i.e., a pixel that is likely to be an isolated point that requires correction) (see B2 in FIG. 1B) while allowing a point indicated by B1 in FIG. 1B to remain. In this case, the four patterns can be distinguished from each other, differing from FIG. 1A.

The above method is described below in connection with a first embodiment. In the first embodiment, the isolated point determination process determines whether or not the processing target pixel is an isolated point. In a second embodiment, the isolated point determination process utilizes the degree of isolation (i.e., an intermediate value between 1 and 0 is used) (see FIGS. 1C and 1D). A third embodiment illustrates an example that utilizes a presumption section that presumes the cause of occurrence of the isolated point (see FIG. 2).

2. First Embodiment

2.1 System Configuration Example

FIG. 3 is a view showing the configuration of an endoscope system that includes an image processing device according to the first embodiment. The endoscope system includes an illumination section 101, an imaging section 102, a processing section 120, a control section 110, an I/F section 111, and an output section 109. Note that the configuration of the endoscope system is not limited to the configuration shown in FIG. 3. Various modifications may be made, such as omitting some of the elements shown in FIG. 3.

Figure 4:
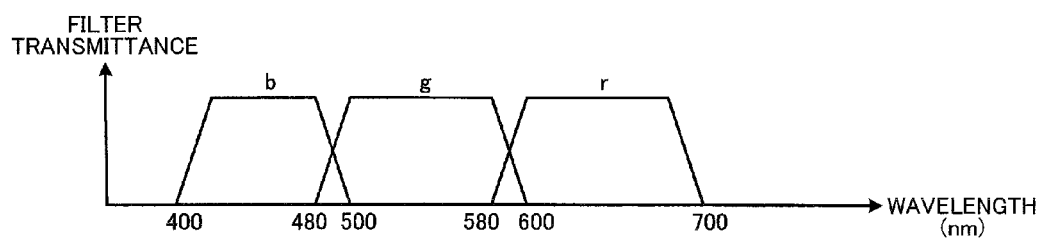
FIG. 4 shows the RGB spectral characteristics of color filters.

The illumination section 101 includes a light source device S1 including a white light source S2, a rotary filter S3, and a condenser lens S4, a light guide fiber S6, and an illumination optical system S7. The imaging section 102 includes a condenser lens S8 and an imaging element S9. The imaging element S9 has a Bayer color filter array. Color filters (RGB) of the imaging element S9 have spectral characteristics shown in FIG. 4, for example.

The processing section 120 includes an A/D conversion section 103, a normal light image acquisition section 104, a special light image acquisition section 105, a linking section 106, an isolated point determination section 107, and a correction control section 108. Note that the configuration of the processing section 120 is not limited to the configuration shown in FIG. 3. Various modifications may be made, such as omitting some of the elements shown in FIG. 3. The control section 110 includes a microcomputer, a CPU, and the like.

The I/F section 111 includes a power supply switch, and a variable setting interface, and the like. The output section 109 is a display section or the like. The output section 109 includes a display such as an LCD.

The A/D conversion section 103 receives an analog signal from the imaging element S9, and is connected to the normal light image acquisition section 104 and the special light image acquisition section 105. The normal light image acquisition section 104 is connected to the linking section 106 and the isolated point determination section 107. The special light image acquisition section 105 is connected to the linking section 106. The linking section 106 is connected to the correction control section 108. The isolated point determination section 107 is connected to the correction control section 108. The correction control section 108 is connected to the output section 109.

The control section 110 is connected to the illumination section 101, the imaging section 102, each section of the processing section 120, the output section 109, and the I/F section 111. The control section 110 controls these sections.

The A/D conversion section 103 converts the analog signal from the imaging element S9 into a digital signal. The normal light image acquisition section 104 receives the digital signal from the A/D conversion section 103, and acquires a normal light image from the digital signal. The special light image acquisition section 105 receives the digital signal from the A/D conversion section 103, and acquires a special light image from the digital signal.

The linking section 106 links the pixels of the normal light image and the special light image. The isolated point determination section 107 performs an isolated point determination process on the processing target pixel (normal light processing target pixel) based on the pixel value of the normal light image. The correction control section 108 performs a correction process on a special light processing target pixel (i.e., the pixel of the special light image that is linked to the normal light processing target pixel by the linking section 106) based on the isolated point determination process performed by the isolated point determination section 107.

2.2 Process Flow

Figure 5:
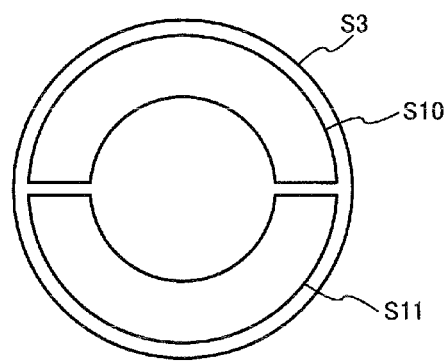
FIG. 5 shows a configuration example of a rotary filter.
Figure 6:
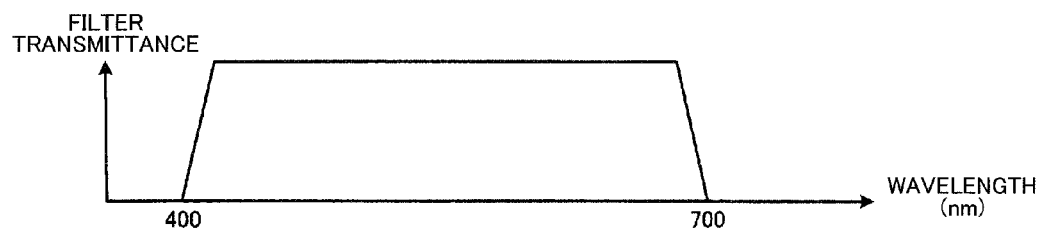
FIG. 6 shows the spectral characteristics of a white light transmission filter.
Figure 7:
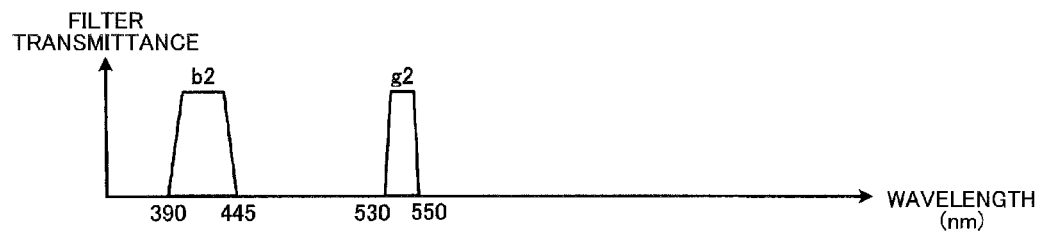
FIG. 7 shows the spectral characteristics of a narrow-band transmission filter.

The flow of the process is described below. The white light source S2 emits white light. As shown in FIG. 5, the rotary filter S3 includes a white light transmission filter S10 and a narrow-band transmission filter S11. The white light transmission filter S10 has spectral characteristics shown in FIG. 6, for example. The narrow-band transmission filter S11 has spectral characteristics shown in FIG. 7, for example.

The white light emitted from the white light source S2 alternately passes through the white light transmission filter S10 and the narrow-band transmission filter S11 of the rotary filter S3. The white light that has passed through the white light transmission filter S10 and special light that has passed through the narrow-band transmission filter S11 are alternately focused by the condenser lens S4.

The focused white light or special light passes through the light guide fiber S6, and is applied to the object from the illumination optical system S7. Reflected light from the object is focused by the condenser lens S8, reaches the imaging element S9 (RGB imaging elements are disposed in a Bayer array), and is converted into an analog signal via photoelectric conversion. The analog signal is transmitted to the A/D conversion section 103.

The analog signal is converted into a digital signal by the A/D conversion section 103. The digital signal is output to the normal light image acquisition section 104, and acquired as the normal light image. The digital signal obtained by the A/D conversion section 103 is also output to the special light image acquisition section 105, and acquired as the special light image.

The normal light image and the special light image can be acquired almost at the same time using a single imaging element by providing the rotary filter.

The linking section 106 links the pixels of the normal light image acquired by the normal light image acquisition section 104 to the pixels of the special light image acquired by the special light image acquisition section 105. The pixel of the special light image corresponding to the processing target pixel (normal light processing target pixel) of the normal light image is hereinafter referred to as a special light processing target pixel.

Since the normal light image and the special light image are acquired using a single imaging element, it is basically easy to link the pixel positions.

When the special light image acquisition section 105 performs a scaling process, the number of pixels may differ between the normal light image and the special light image. In this case, the linking section 106 links the pixels of the not mal light image and the special light image after increasing or decreasing the size of the normal light image so that the normal light image has the same size as that of the special light image.

When using a single imaging element, the normal light image and the special light image are acquired at a small time interval. Therefore, the pixels may be linked based on the object.

A known feature detection method may perform a correction process by performing an object matching process on similar images. However, since the special light image differs from the normal light image due to enhancement of a vessel structure and the like, it is difficult to perform a matching process on the normal light image and the special light image.

For example, a pseudo-special light image may be generated by performing a given image process (e.g., an image process using a spectral estimation method) on the normal light image. Since the object (imaging target) included in an appropriately processed pseudo-special light image is the same as the object included in the special light image, a matching process can be performed on the pseudo-special light image and the special light image using a known feature detection method. Since the pseudo-special light image is generated from the normal light image, a matching process can be easily performed on the pseudo-special light image and the normal light image. Therefore, the normal light image and the special light image can be linked by utilizing the pseudo-special light image.

As another example, the pixel of the special light image at the same position as that of the normal light processing target pixel is used as the special light processing target pixel. When an isolated point occurs due to a defect in the imaging element, the isolated point appears at the same position.

The isolated point determination section 107 determines whether or not each pixel of the normal light image acquired by the normal light image acquisition section 104 is an isolated point.

For example, the isolated point determination section 107 calculates the average value of the pixels adjacent to the normal light processing target pixel, calculates the difference between the average value and the pixel value of the processing target pixel, compares the absolute value of the difference with a given threshold value, and determines that the normal light processing target pixel is an isolated point when the absolute value of the difference is larger than the given threshold value.

Alternatively, the isolated point determination section 107 calculates the median value of the pixels adjacent to the normal light processing target pixel, calculates the difference between the median value and the pixel value of the processing target pixel, compares the absolute value of the difference with a given threshold value, and determines that the normal light processing target pixel is an isolated point when the absolute value of the difference is larger than the given threshold value.

It is also possible to calculate the average value or the median value using pixels positioned near the normal light processing target pixel instead of using the pixels adjacent to the normal light processing target pixel. It is also possible to use a known isolated point determination method.

The correction control section 108 then performs an isolated point correction process on the pixel of the special light image. Specifically, the correction control section 108 performs the correction process on the special light processing target pixel (linked by the linking section 106) corresponding to the pixel of the isolated point of the normal light image determined by the isolated point determination section 107.

For example, the correction control section 108 replaces the pixel value of the special light processing target pixel with the average value of the pixel values of the peripheral pixels (special light peripheral pixels) of the correction target special light processing target pixel in the special light image. Alternatively, the correction control section 108 may replace the pixel value of the special light processing target pixel with the median value of the pixel values of the special light peripheral pixels. The correction control section 108 may add a given value to the pixel value of the special light processing target pixel, or may subtract a given value from the pixel value of the special light processing target pixel.

The output section 109 outputs the special light image that has been acquired by the special light image acquisition section 10 and subjected to the isolated point correction process by the correction control section 108. The output section 109 directly outputs the pixels that have not been corrected. The special light image is output to a display device such as a monitor. The normal light image may be output together with the special light image.

A pixel of the special light image that is the original component of the special light image and significantly differs from the peripheral pixels is not determined to be an isolated point by thus utilizing the isolated point determination results for the normal light image.

2.3 Details of Process

Figure 8:
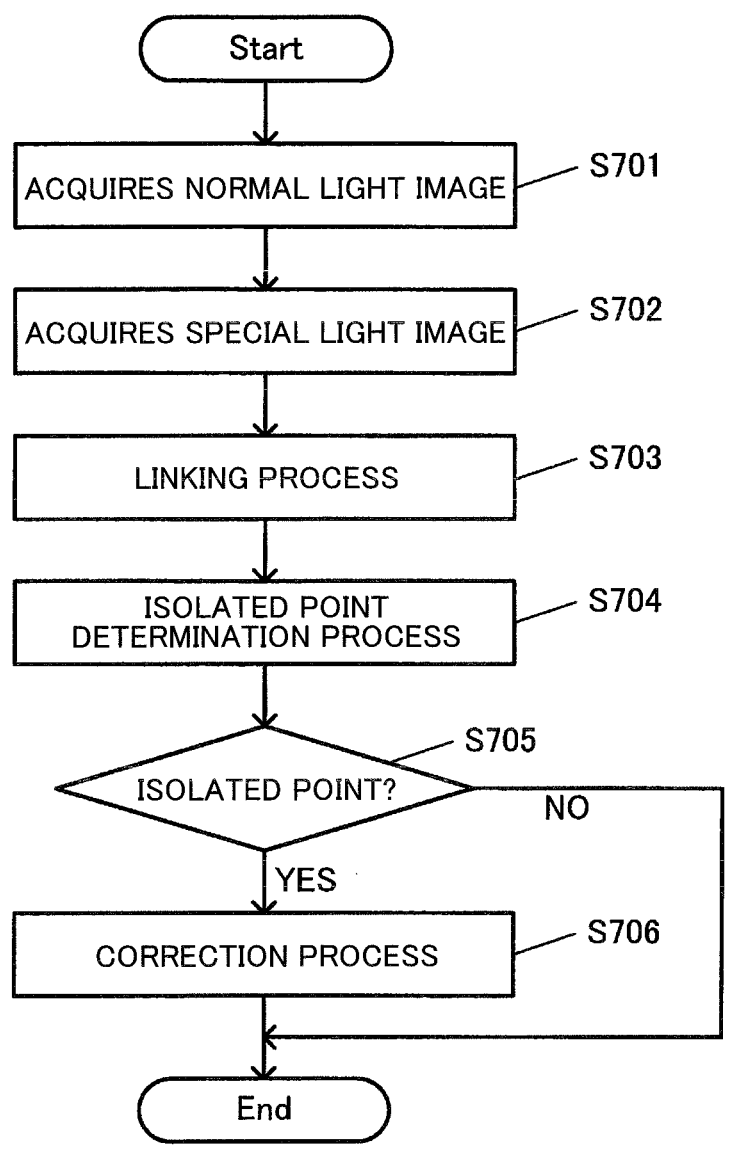
FIG. 8 is a flowchart illustrative of a process according to the first embodiment.

FIG. 8 is a flowchart showing the details of the process performed by the image processing device according to this embodiment. The normal light image acquisition section 104 acquires the normal light image (S701). The special light image acquisition section 105 acquires the special light image (S702).

The linking section 106 then links the pixels of the normal light image and the special light image (S703). The isolated point determination section 107 then performs the isolated point determination process on the processing target pixel of the normal light image (S704).

The isolated point determination section 107 determines whether or not the normal light processing target pixel is an isolated point (S705). When the normal light processing target pixel is an isolated point, the correction control section 108 performs the correction process (S706). When the normal light processing target pixel is not an isolated point, the correction control section 108 does not perform the correction process.

2.4 First Modification (Isolated Point Determination Process that Also Uses Special Light Image)

An example in which the isolated point determination section 107 performs the isolated point determination process based on the normal light image has been described above. Note that the configuration is not limited thereto. The isolated point determination section 107 may perform the isolated point determination process based on the pixel value of the special light image in addition to the isolated point determination process based on the pixel value of the normal light image. The correction control section 108 may perform the correction process taking account of the isolated point determination results for the normal light image and the isolated point determination results for the special light image. For example, the correction control section 108 performs the isolated point correction process when the normal light processing target pixel and the special light processing target pixel have been determined to be an isolated point.

Figure 9:
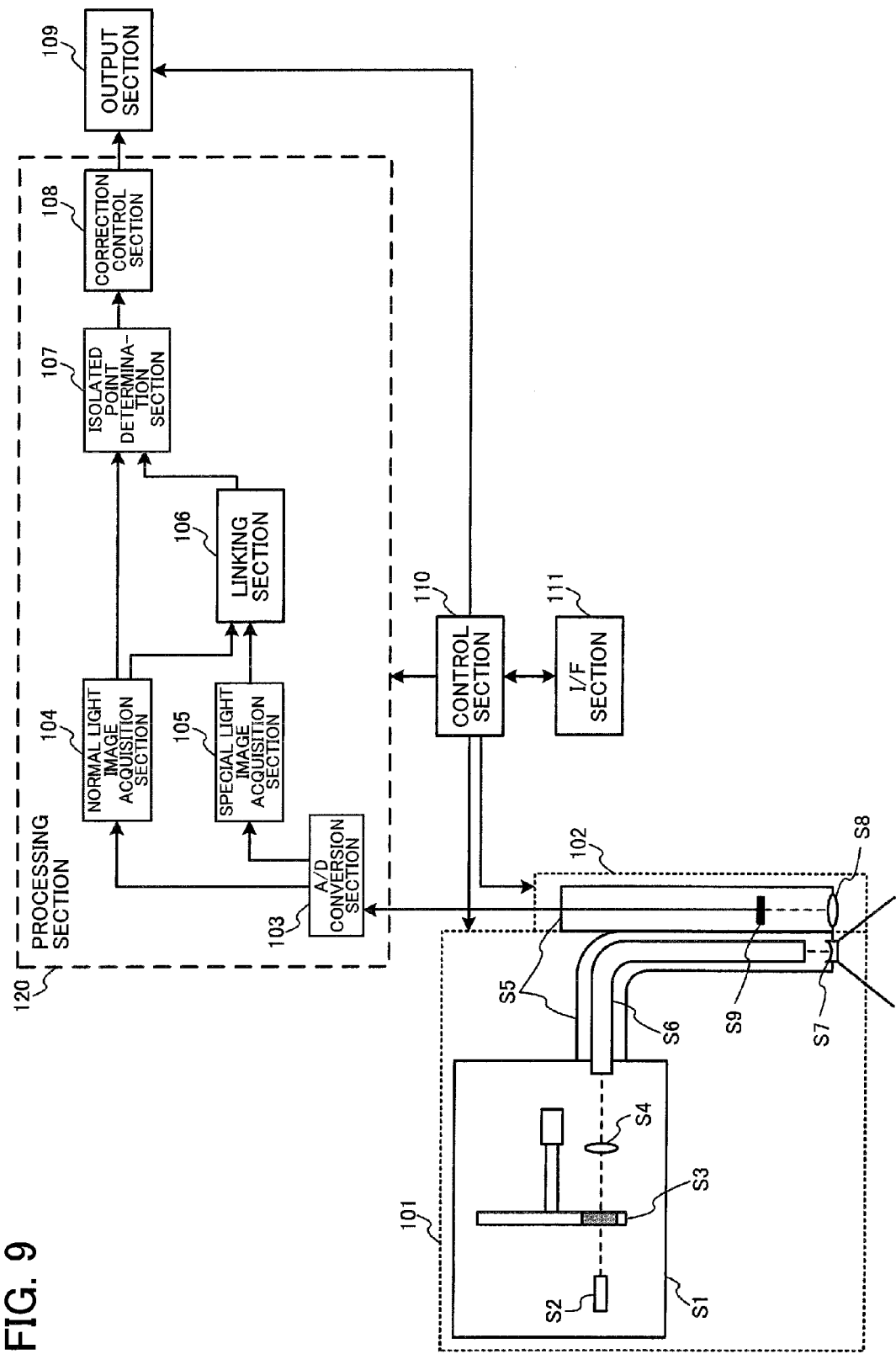
FIG. 9 shows another configuration example of an endoscope system that includes an image processing device according to one embodiment of the invention.

FIG. 9 is a block diagram employed in this case. In FIG. 3, the process of the linking section 106 and the process of the isolated point determination section 107 are performed in parallel (in an arbitrary order), and the results of the linking process performed by the linking section 106 are input to the correction control section 108. However, when performing the isolated point determination process based on the pixel value of the special light image, the isolated point determination section 107 must have information about the special light image that has been linked (i.e., information about the special light processing target pixel). Therefore, the linking section 106 is connected to the isolated point determination section 107 instead of the correction control section 108. In this case, the linking process is performed before the isolated point determination process.

Figure 10:
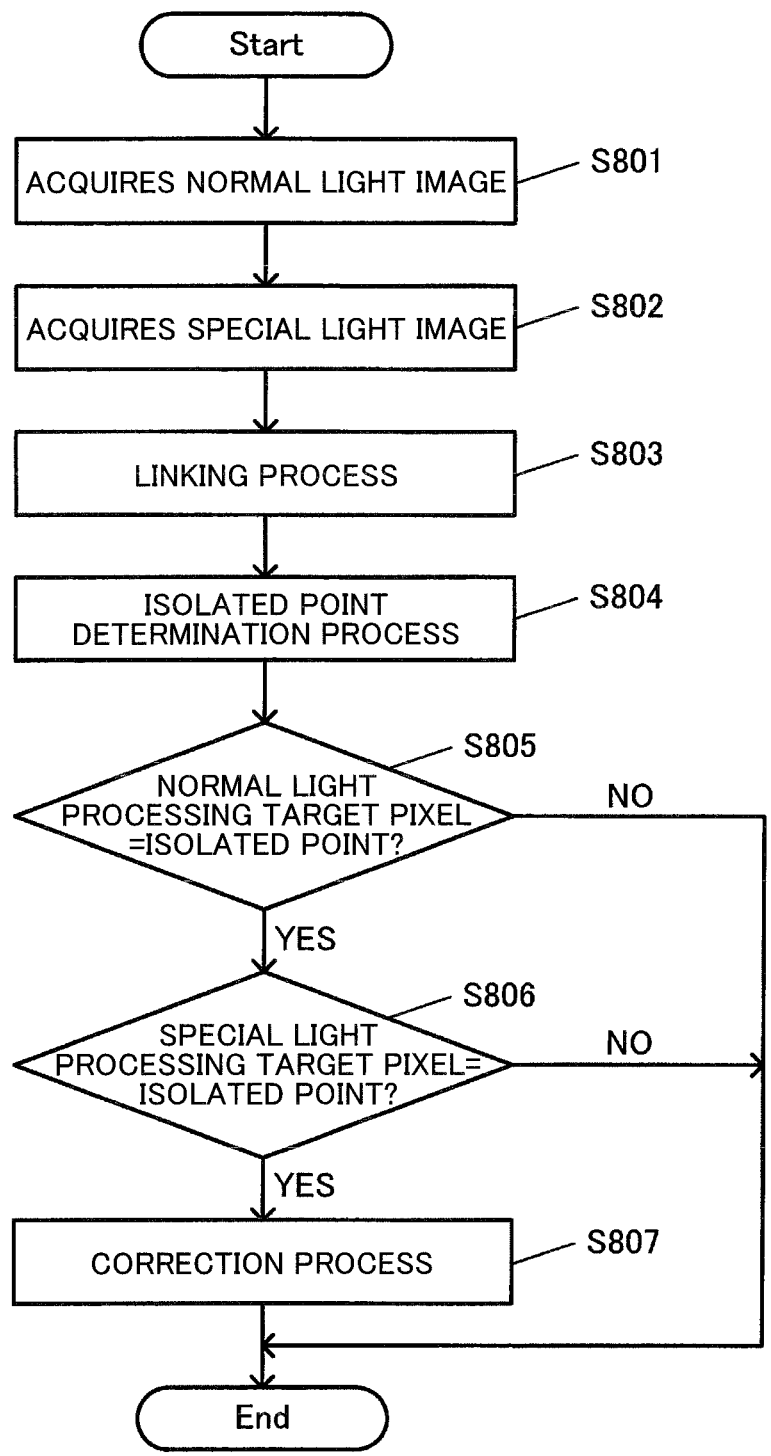
FIG. 10 is a flowchart illustrative of a process according to a modification of the first embodiment.

FIG. 10 is a flowchart showing the details of the above process. The normal light image acquisition section 104 acquires the normal light image (S801). The special light image acquisition section 105 acquires the special light image (S802).

The linking section 106 then links the pixels of the normal light image and the special light image (S803). The isolated point determination section 107 then performs the isolated point determination process on the processing target pixel of the normal light image and the processing target pixel of the special light image (S804).

The isolated point determination section 107 determines whether or not the normal light processing target pixel is an isolated point (S805). When the normal light processing target pixel is an isolated point, the isolated point determination section 107 determines whether or not the special light processing target pixel is an isolated point (S806). When the special light processing target pixel is an isolated point, the correction control section 108 performs the correction process (S807). When the normal light processing target pixel and/or the special light processing target pixel is not an isolated point, the correction control section 108 does not perform the correction process.

2.5 Second Modification (Another Configuration Example of Illumination Section and Imaging Section)

Figure 11:
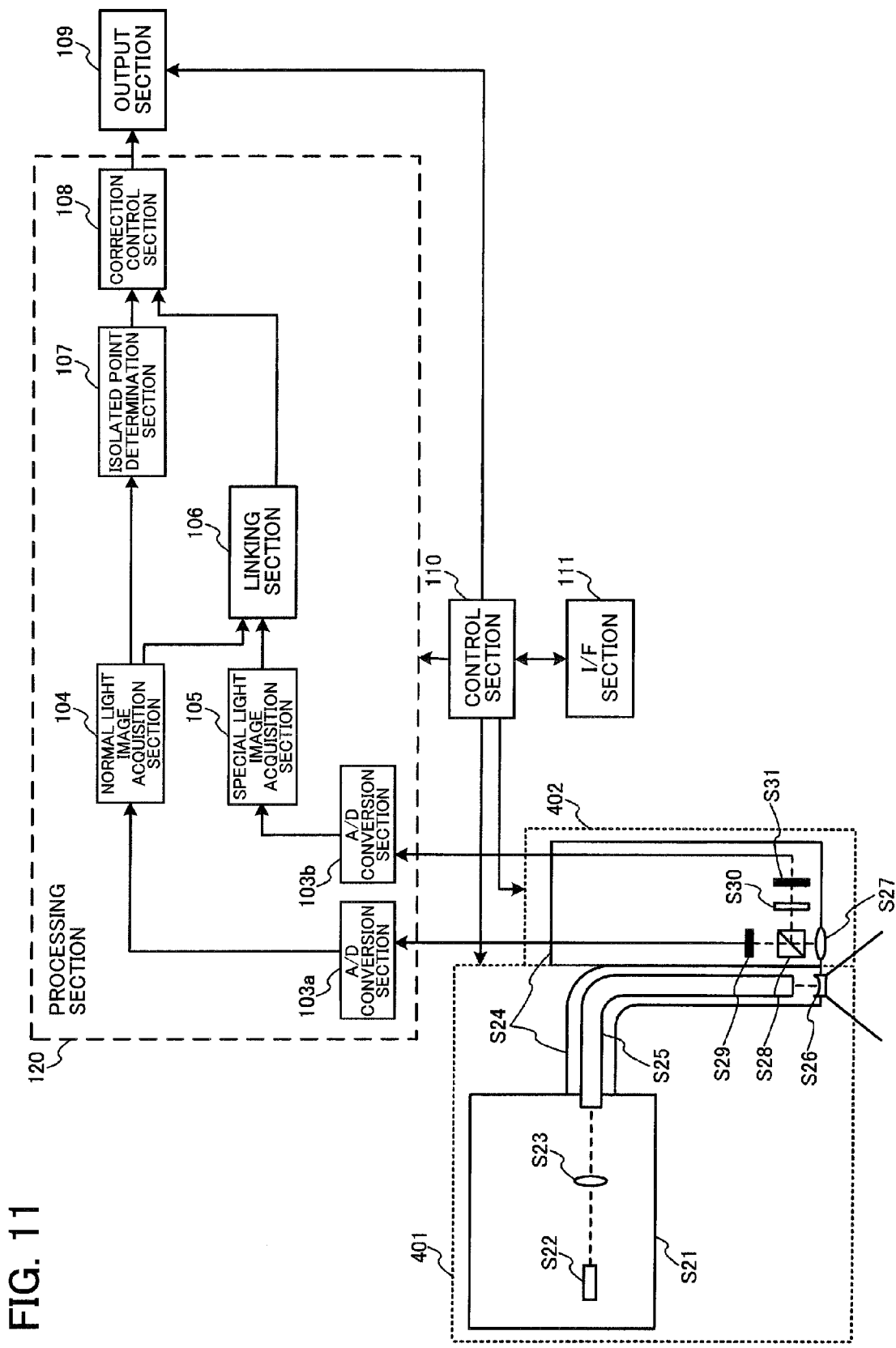
FIG. 11 shows another configuration example of an endoscope system that includes an image processing device according to one embodiment of the invention.

The endoscope system that includes the image processing device according to this embodiment may have a configuration shown in FIG. 11. As shown in FIG. 11, the illumination section 101 is replaced with an illumination section 401, and the imaging section 102 is replaced with an imaging section 402. A/D conversion sections 103a and 103b are provided in the processing section 120.

The illumination section 401 includes a light source device S21 including a white light source S22 and a condenser lens S23, a light guide fiber S25, and an illumination optical system S26. The imaging section 402 includes a condenser lens S27, a splitter S28, a normal light imaging element S29, a narrow-band transmission filter S30, and a special light imaging element S31.

The normal light imaging element S29 and the special light imaging element S31 are imaging elements that include a Bayer color filter array. The color filters (RGB) of the normal light imaging element S29 and the special light imaging element S31 have spectral characteristics shown in FIG. 4, for example. The narrow-band transmission filter S30 has transmission characteristics shown in FIG. 7.

The flow of the process is described below. The illumination section 401 applies white light to the object, and reflected light from the object is captured by the imaging section 402. Specifically, white light emitted from the white light source S22 is focused by the condenser lens S23, passes through the light guide fiber S25, and is applied to the object from the illumination optical system S26.

The reflected light from the object is focused by the condenser lens S27, and split into two rays by the splitter S28. On of the two rays reaches the imaging element S29 (RGB imaging elements are disposed in a Bayer array), and is converted into an analog signal via photoelectric conversion. The analog signal is transmitted to the A/D conversion section 103a. The other of the two rays passes through the narrow-band transmission filter S30 that allows only light within a specific wavelength band that is narrower than that of white light to pass through, reaches the special light imaging element S31 (RGB imaging elements are disposed in a Bayer array), and is converted into an analog signal via photoelectric conversion. The analog signal is transmitted to the A/D conversion section 103b.

The analog signal acquired by the normal light imaging element S29 is converted into a digital signal by the A/D conversion section 103a, and acquired by the normal light image acquisition section 104 as the normal light image.

The analog signal acquired by the special light imaging element S31 is converted into a digital signal by the A/D conversion section 103b, and acquired by the special light image acquisition section 105 as the special light image.

According to this modification, the normal light image and the special light image can be acquired at the same time by utilizing the two imaging elements. The imaging elements need not necessarily have an identical number of pixels (i.e., the number of pixels may differ between the normal light image and the special light image).

For example, the linking section 106 increases or decreases the size of the normal light image or the special light image so that the normal light image and the special light image have the same size, and links the pixels of the normal light image and the special light image at the same position.

The subsequent process is the same as described above. Therefore, detailed description thereof is omitted. The normal light image and the special light image at the same timing can be acquired by utilizing the above configuration.

Figure 12:
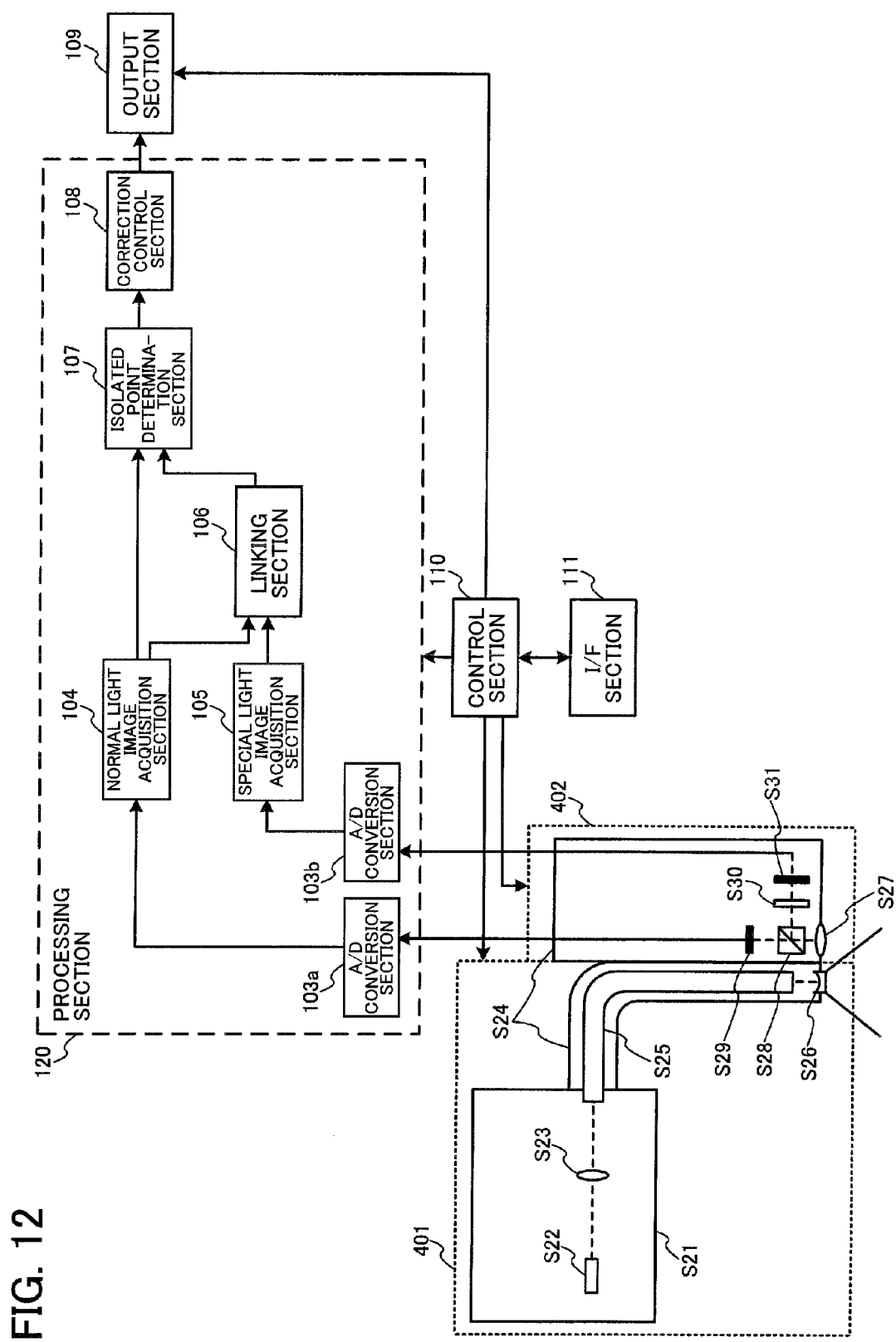
FIG. 12 shows another configuration example of an endoscope system that includes an image processing device according to one embodiment of the invention.

A configuration shown in FIG. 12 is used when performing the isolated point determination process based on the pixel value of the special light image while utilizing two imaging elements. In this case, the signal output from the linking section 106 is input to the isolated point determination section 107.

The imaging element may utilize an imaging method other than that using the RGB Bayer array. For example, the imaging element may receive a complementary color.

According to the first embodiment, the image processing device includes the normal light image acquisition section 104 that acquires the normal light image, the special light image acquisition section 105 that acquires the special light image, the isolated point determination section 107 that performs the isolated point determination process based on the pixel value of the normal light processing target pixel and the pixel values of the normal light peripheral pixels, and the correction control section 108 that performs (controls) the correction process on the special light image based on the isolated point determination process performed by the isolated point determination section 107 (see FIG. 3).

Note that the normal light processing target pixel refers to a processing target pixel included in the normal light image, and the normal light peripheral pixel refers to a pixel positioned around the normal light processing target pixel. The normal light peripheral pixel may not be adjacent to the normal light processing target pixel.

This makes it possible to acquire the normal light image and the special light image, and correct the special light image using the pixel value of the normal light image. Since the special light image is not corrected when it has been determined that the normal light image does not includes an isolated point, the original component of the object can be maintained (see A1 in FIG. 1A). This makes it possible to provide the observer with the special light image while suppressing omission of information as much as possible.

The isolated point determination section 107 may determine that the normal light processing target pixel is an isolated point when the absolute value of the difference between a value calculated from the pixel values of the normal light peripheral pixels and the pixel value of the normal light processing target pixel is larger than a given threshold value.

This makes it possible to determine whether or not the normal light processing target pixel is an isolated point by comparing the absolute value of the difference between the pixel value of the normal light processing target pixel and a value calculated from the pixel values of the normal light peripheral pixels (e.g., the average value or the median value of the pixel values of a plurality of normal light peripheral pixels) with a given threshold value.

As shown in FIG. 3, the image processing device may include the linking section 106 that links the normal light processing target pixel and the special light processing target pixel. The correction control section 108 may correct the special light processing target pixel corresponding to the normal light processing target pixel that has been determined to be an isolated point by the isolated point determination section 107.

The special light processing target pixel refers to a pixel that is included in the special light image and linked to the normal light processing target pixel. For example, when the normal light image and the special light image have the same size (number of pixels), the special light processing target pixel refers to a point that is located at the same position within the normal light image and the special light image. Specifically, when the normal light processing target pixel is the point (X, Y)=(10, 20) in the normal light image, the point (X, Y)=(10, 20) in the special light image may be determined to be the special light processing target pixel.

This makes it possible to link the normal light image and the special light image. In this embodiment, the isolated point determination process is performed on the normal light image in order to perform the image process (correction process) on the special light image. Therefore, the accuracy of the process can be improved by performing an accurate linking process using the linking section 106.

The correction control section 108 may replace the pixel value of the special light processing target pixel with a value calculated from the pixel values of the special light peripheral pixels.

Note that the special light peripheral pixel refers to a pixel positioned around the special light processing target pixel. The special light peripheral pixel may not be adjacent to the special light processing target pixel.

This makes it possible to replace the pixel value of a pixel that has been determined to be an isolated point (i.e., the special light processing target pixel corresponding to the normal light processing target pixel that has been determined to be an isolated point) with a value calculated from the pixel values of the special light peripheral pixels. For example, the pixel value of the special light processing target pixel may be replaced with the average value of the pixel values of the special light peripheral pixels.

The isolated point determination section 107 may perform the isolated point determination process on the special light processing target pixel based on the pixel value of the special light processing target pixel and the pixel values of the special light peripheral pixels.

This makes it possible to perform the isolated point determination process based on the pixel value of the special light processing target pixel in addition to the isolated point determination process based on the pixel value of the normal light image, so that the accuracy of the isolated point determination process can be improved.

The correction control section 108 may correct the special light processing target pixel when the isolated point determination section 107 has determined that the normal light processing target pixel is an isolated point, and determined that the special light processing target pixel corresponding to the normal light processing target pixel is an isolated point.

This makes it possible to implement correction control shown in FIG. 1B. Specifically, information that is considered to be an isolated point (see B2 in FIG. 1B) can be corrected while allowing information about the original component of the object to remain (see B1 in FIG. 1B).

The term "specific wavelength band" refers to a band that is narrower than the wavelength band of white light. Specifically, the special light image may be an in vivo image, and the specific wavelength band may be the wavelength band of light absorbed by hemoglobin in blood. More specifically, the specific wavelength band may be 390 to 445 nm or 530 to 550 nm.

This makes it possible to observe the structure of a surface area of tissues and a blood vessel located in a deep area. A lesion area (e.g., epidermoid cancer) that cannot be easily observed using normal light can be displayed as a brown area or the like by inputting the resulting signal to a given channel (R, G, or B), so that the lesion area can be reliably detected (i.e., a situation in which the lesion area is missed can be prevented). A wavelength band of 390 to 445 nm or 530 to 550 nm is selected from the viewpoint of absorption by hemoglobin and the ability to reach a surface area or a deep area of tissues. Note that the wavelength band is not limited thereto. For example, the lower limit of the wavelength band may be decreased by about 0 to 10%, and the upper limit of the wavelength band may be increased by about 0 to 10% depending on a variation factor (e.g., experimental results for absorption by hemoglobin and the ability to reach a surface area or a deep area of a living body).

The special light image may be an in vivo image. The specific wavelength band included in the in vivo image may be the wavelength band of fluorescence emitted from a fluorescent substance. Specifically, the specific wavelength band may be 490 to 625 nm.

This makes it possible to implement autofluorescence imaging (AFI). Intrinsic fluorescence from a fluorescent substance (e.g., collagen) can be observed by applying excitation light (390 to 470 nm). In this case, the lesion area can be highlighted in a color differing from that of a normal mucous membrane, so that the lesion area can be reliably detected, for example. A wavelength band of 490 to 625 nm is the wavelength band of fluorescence emitted from a fluorescent substance (e.g., collagen) when excitation light is applied. Note that the wavelength band is not limited thereto. For example, the lower limit of the wavelength band may be decreased by about 0 to 10%, and the upper limit of the wavelength band may be increased by about 0 to 10% depending on a variation factor (e.g., experimental results for the wavelength band of fluorescence emitted from a fluorescent substance). A pseudo-color image may be generated by simultaneously applying light having a wavelength band of 540 to 560 nm that is absorbed by hemoglobin.

The special light image may be an in vivo image. The specific wavelength band included in the in vivo image may be the wavelength band of infrared light. Specifically, the specific wavelength band may be 790 to 820 nm or 905 to 970 nm.

This makes it possible to implement infrared imaging (IRI). Information about the vessel or the blood flow in a deep area of the mucous membrane that cannot be easily observed visually can be highlighted by intravenously injecting indocyanine green (ICG) (infrared marker) that easily absorbs infrared light, and applying infrared light within the above wavelength band, so that the depth of cancer invasion or therapeutic strategy can be determined, for example. An infrared marker exhibits maximum absorption in a wavelength band of 790 to 820 nm, and exhibits minimum absorption in a wavelength band of 905 to 970 nm. Note that the wavelength band is not limited thereto. For example, the lower limit of the wavelength band may be decreased by about 0 to 10%, and the upper limit of the wavelength band may be increased by about 0 to 10% depending on a variation factor (e.g., experimental results for absorption by the infrared marker).

This embodiment also relates to a program that causes a computer to function as the normal light image acquisition section 104, the special light image acquisition section 105, the isolated point determination section 107, and the correction control sections 108.

This makes it possible to store image data (e.g., capsule endoscope), and process the stored image data by software using a computer system (e.g., PC).

3. Second Embodiment

3.1 Configuration Example

FIG. 3 is a view showing the configuration of an endoscope system that includes an image processing device according to the second embodiment. The endoscope system includes an illumination section 101, an imaging section 102, a processing section 120, a control section 110, an I/F section 111, and an output section 109 in the same manner as in the first embodiment. Note that the configuration of the endoscope system is not limited to the configuration shown in FIG. 3. Various modifications may be made, such as omitting some of the elements shown in FIG. 3.

The configuration of each section is the same as described above in connection with the first embodiment. Therefore, detailed description is omitted.

3.2 Process Flow

The flow of the process is described below. This embodiment differs from the first embodiment in that the degree of isolation (i.e., a point may have a value between 0 and 1) is determined during the isolated point determination process, and the isolated point correction process is performed based on the degree of isolation.

The processes performed by the illumination section 101, the imaging section 102, the A/D conversion section 103, the normal light image acquisition section 104, the special light image acquisition section 105, and the linking section 106 are the same as described above in connection with the first embodiment. Therefore, detailed description is omitted. The process performed by the isolated point determination section 107 is described below. The isolated point determination section 107 calculates the degree of isolation of each pixel of the normal light image acquired by the normal light image acquisition section 104.

Figure 13:
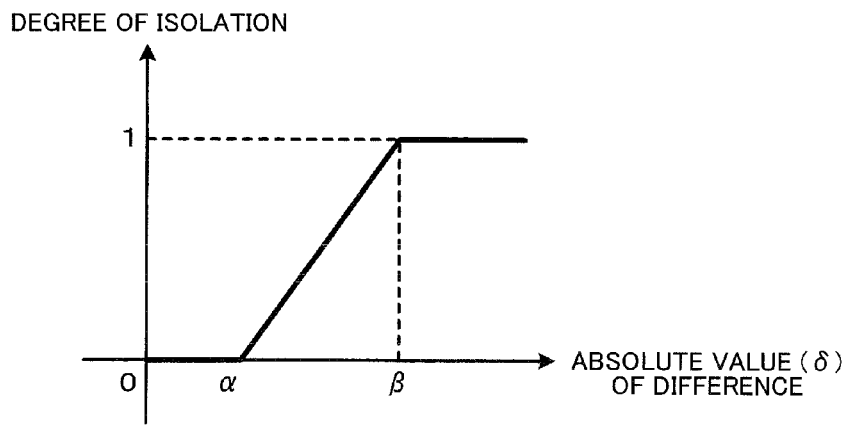
FIG. 13 is a view illustrative of the relationship between the absolute difference (absolute value of a difference) and the degree of isolation.

For example, the degree of isolation is calculated as described below. A threshold value $\alpha$ ($\geq 0$) at which the degree of isolation is 0, and a threshold value $\beta$ ($\geq \alpha$) at which the degree of isolation is 1 (=100%) are provided in advance. The average value of the pixel values of the pixels adjacent to the normal light processing target pixel is calculated, and the difference between the average value and the pixel value of the normal light processing target pixel is calculated. The absolute value $\delta$ of the difference is compared with the threshold values $\alpha$ and $\beta$. When the absolute value $\delta$ is equal to or smaller than the threshold value $\alpha$, the degree of isolation is determined to be 0. When the absolute value $\delta$ is equal to or larger than the threshold value $\beta$, the degree of isolation is determined to be 1. When the absolute value $\delta$ is larger than the threshold value $\alpha$ and smaller than the threshold value $\beta$, the degree of isolation is determined to be "$(\delta-\alpha)/(\beta-\alpha)$". FIG. 13 shows the above relationship. When the absolute value $\delta$ is larger than the threshold value $\alpha$ and smaller than the threshold value $\beta$, the degree of isolation changes linearly within the range of 0 to 1.

Note that the median value of the pixel values of the pixels adjacent to the processing target pixel may be used instead of the average value of the pixel values of the pixels adjacent to the processing target pixel.

It is also possible to calculate the average value or the median value using pixels positioned near the normal light processing target pixel instead of using the pixels adjacent to the normal light processing target pixel. A known degree of isolation calculation method as disclosed in JP-A-2009-188822 may also be used.

The correction control section 108 performs the isolated point correction process on the pixel of the special light image. Specifically, the correction control section 108 corrects the special light processing target pixel that has been linked by the linking section 106 to the normal light processing target pixel for which the degree of isolation calculated by the isolated point determination section 107 is larger than 0.

Figure 14:
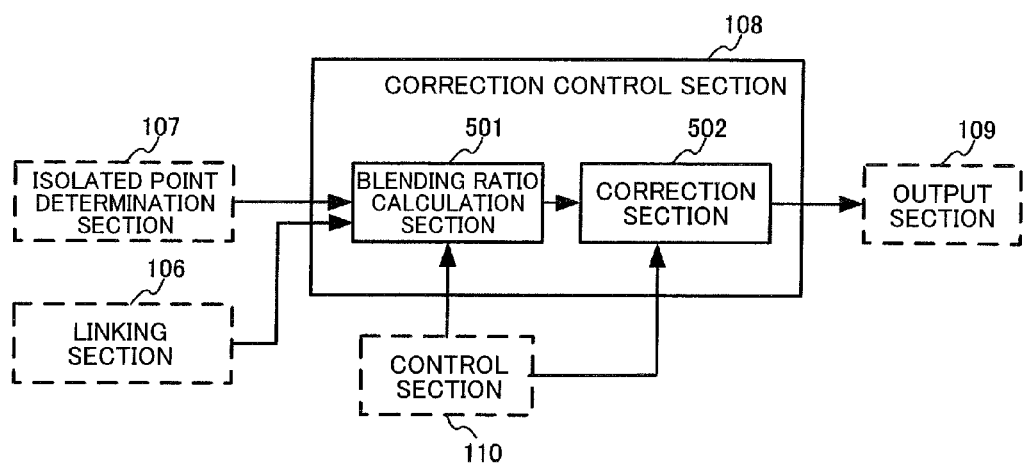
FIG. 14 shows a configuration example of a correction control section.

As shown in FIG. 14, the correction control section 108 may include a blending ratio calculation section 501. The blending ratio calculation section 501 calculates the blending ratio $\gamma$ of the special light processing target pixel and a given calculated value. The blending ratio may be calculated using the degree of isolation.

An example of the correction process is described below. The average value of the pixel values of the pixel values of the pixels adjacent to the special light processing target pixel is calculated to obtain the given calculated value. The blending ratio of the special light processing target pixel is obtained by subtracting the blending ratio $\gamma$ from one. The blending ratio of the given calculated value is $\gamma$. The correction section 502 blends the pixel value of the special light processing target pixel and the given calculated value in the blending ratio to obtain a corrected pixel value $$\text{Pixel value of special light processing target pixel}*(1-\gamma)+\text{given calculated value}\times\gamma \qquad (1)$$

Note that the median value of the pixel values of the pixels adjacent to the processing target pixel may be used instead of the average value of the pixel values of the pixels adjacent to the processing target pixel.

The output section 109 outputs the special light image that has been acquired by the special light image acquisition section 10 and subjected to the isolated point correction process by the correction control section 108. The output section 109 directly outputs the pixels that have not been corrected. The special light image is output to a display device such as a monitor. The normal light image may be output together with the special light image.

This makes it possible to reflect the original component of the special light processing target pixel in the correction process (i.e., an appropriate correction process can be performed).

3.3 Modification

The isolated point determination section 107 may calculate the degree of isolation based on the pixel value of the special light image in addition to calculating the degree of isolation based on the pixel value of the normal light image. In this case, the endoscope system is configured in the same manner as in FIG. 9. The correction control section 108 may perform the correction process taking account of the degree of isolation of the normal light image and the degree of isolation of the special light image. For example, the correction control section 108 performs the correction process using a value obtained by multiplying the degree of isolation of the normal light image by the degree of isolation of the special light image. Note that the value used as the degree of isolation may be calculated by another method. For example, the average value of the degree of isolation of the normal light image and the degree of isolation of the special light image may be used, or one of the degree of isolation of the normal light image and the degree of isolation of the special light image that is larger or smaller than the other may be used.

The configuration shown in FIG. 11 or 12 may be used in the same manner as in the first embodiment. The imaging element may utilize an imaging method other than that using the RGB Bayer array. For example, the imaging element may receive a complementary color. The special light imaging element may have a configuration in which the G and B color filters are disposed in a staggered arrangement.

In this embodiment, the isolated point determination section 107 acquires the isolated point determination information that indicates the result of the isolated point determination process. Specifically, the isolated point determination section 107 acquires the degree of isolation as the isolated point determination information based on a value calculated from the normal light peripheral pixels and the pixel value of the normal light processing target pixel. The correction control section 108 controls the correction process performed on the special light image based on the degree of isolation.

This makes it possible to acquire the degree of isolation as the result of the isolated point determination process, differing from the first embodiment. Specifically, since an intermediate correction process is performed, the original component can be reflected in the correction process. This makes it possible to provide the observer with an excellent special light image.

The isolated point determination section 107 may acquire the degree of divergence of the pixel value of the normal light processing target pixel from a value calculated from the normal light peripheral pixels as the degree of isolation.

In this case, the degree of isolation increases as the degree of divergence of the pixel value of the normal light processing target pixel from the pixel values of the peripheral pixels increases. For example, the configuration shown in FIG. 13 may be used. Specifically, the degree of isolation increases (<1) as the degree of divergence (i.e., the absolute value of the difference) increases.

As shown in FIG. 3, the image processing device may include the linking section 106 that links the normal light image and the special light image. The correction control section 108 may set the blending ratio of a given value calculated from the pixel values of the special light peripheral pixels and the pixel value of the special light processing target pixel based on the degree of isolation, and may perform the correction process by blending the given value and the pixel value of the special light processing target pixel based on the blending ratio. Specifically, the correction control section 108 performs the process indicated by the expression (1). For example, the blending ratio of the pixel value of the special light processing target pixel may be reduced as the degree of isolation increases.

The given value calculated from the pixel values of the special light peripheral pixels may be the average value or the median value of the pixel values of the special light peripheral pixels.

This makes it possible to set the blending ratio based on the degree of isolation, and blend the given value calculated from the pixel values of the special light peripheral pixels and the pixel value of the special light processing target pixel in the set blending ratio. Specifically, since an intermediate correction process is performed, the original component can be reflected in the correction process. For example, when the blending ratio is 0, the resulting value is equal to the pixel value of the special light processing target pixel before correction. When the blending ratio is 1, the resulting value is equal to a given value (e.g., average value or median value). When the blending ratio is a value between 0 and 1, the resulting value is an intermediate value between the above values. For example, the degree of isolation may be equal to the blending ratio. In this case, the blending ratio of the pixel value of the special light processing target pixel decreases as the degree of isolation increases. This makes it possible to implement an appropriate correction process.

In this embodiment, the image processing device may include a gain-up section shown in FIG. 16 (described later in connection with the third embodiment). The correction control section 108 may perform the correction process on the special light image subjected to a gain-up process based on the degree of isolation.

This makes it possible to perform the gain-up process on the special light image that is normally dark, and then correct the special light image subjected to the gain-up process.

As shown in FIG. 3, the image processing device may include the linking section 106 that links the normal light image and the special light image. The correction control section 108 may set the blending ratio of a given value calculated from an increment due to the gain-up process and the pixel value of the special light processing target pixel based on the degree of isolation, and may perform the correction process by blending the given value and the pixel value of the special light processing target pixel based on the blending ratio. Specifically, the correction control section 108 performs the process indicated by an expression (2) described later.

This makes it possible to set the blending ratio based on the degree of isolation, and blend an increment due to the gain-up process and the pixel value of the special light processing target pixel in the set blending ratio. This makes it possible to provide the observer with an excellent special light image due to an intermediate correction process. For example, when the blending ratio is 0, the resulting value is equal to the pixel value of the special light processing target pixel before correction. When the blending ratio is 1, the resulting value is equal to a given value (e.g., the pixel value of the special light processing target pixel before the gain-up process). When the blending ratio is a value between 0 and 1, the resulting value is an intermediate value between the above values.

4. Third Embodiment 4.1 Configuration Example

FIG. 9 is a view showing the configuration of an endoscope system that includes an image processing device according to this embodiment. The endoscope system includes an illumination section 101, an imaging section 102, a processing section 120, a control section 110, an I/F section 111, and an output section 109 in the same manner as in the first and second embodiments. Note that the configuration of the endoscope system is not limited to the configuration shown in FIG. 9. Various modifications may be made, such as omitting some of the elements shown in FIG. 9.

Figure 15:
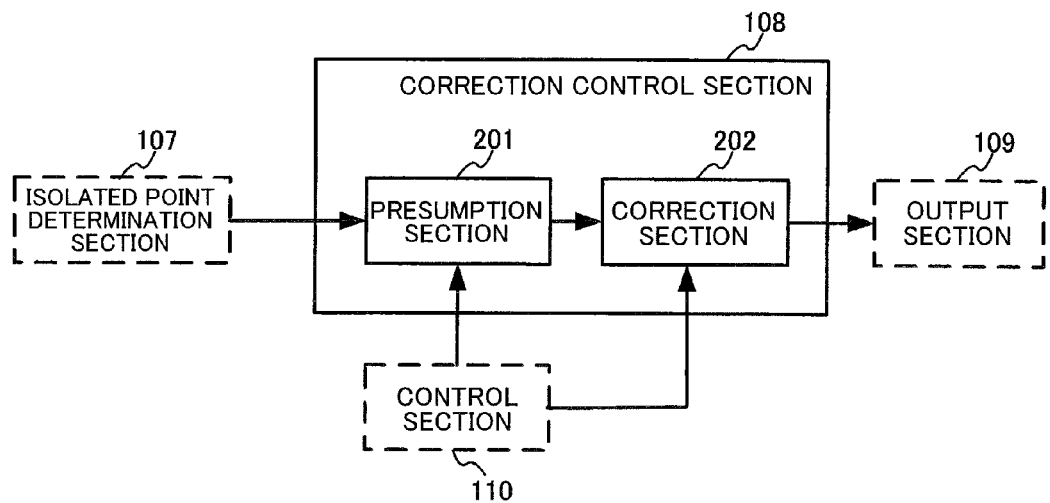
FIG. 15 shows another configuration example of a correction control section.

In this embodiment, the correction control section 108 includes a presumption section 201 (see FIG. 15). The presumption section 201 presumes the cause of occurrence of the isolated point at the special light processing target pixel. A correction section 202 performs a correction process based on the presumption.

Figure 16:
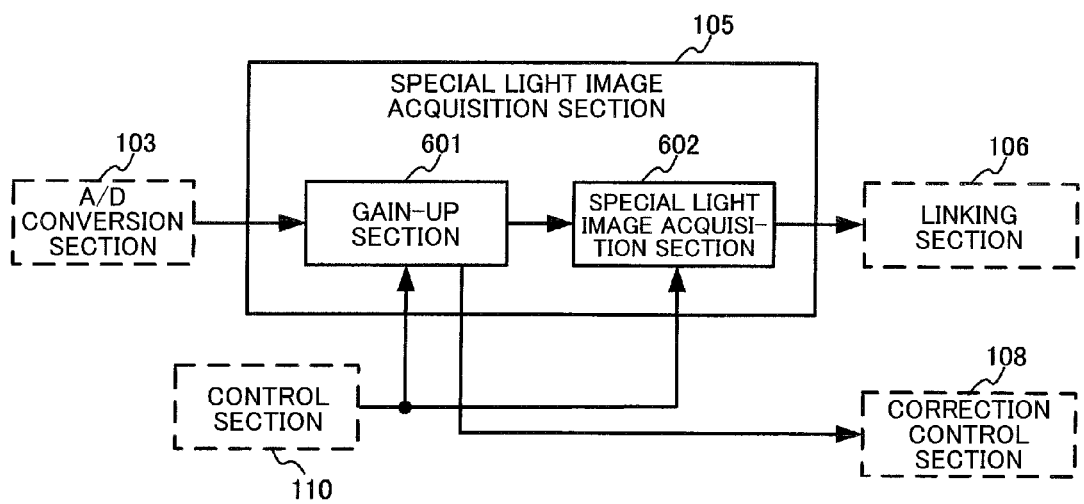
FIG. 16 shows a configuration example of a special light image acquisition section.

As shown in FIG. 16, the special light image acquisition section 105 includes a gain-up section 601. Note that the gain-up section 601 may also be provided in the first and second embodiments.

4.2 Process Flow

The flow of the process is described below. The following description is given taking an example in which the process performed by the isolated point determination section 107 is the same as described above in connection with the second embodiment (i.e., the degree of isolation is calculated). Note that the configuration according to this embodiment is not limited thereto. For example, whether or not the processing target pixel is an isolated point may be determined in the same manner as in the first embodiment. The isolated point determination process is performed using the normal light image and the special light image in the same manner as in the modifications of the first and second embodiments.

The processes performed by the illumination section 101, the imaging section 102, the A/D conversion section 103, the normal light image acquisition section 104, the linking section 106, and the isolated point determination section 107 are the same as described above in connection with the second embodiment. Therefore, detailed description is omitted. The following description focuses on the differences from the above embodiments.

The gain-up section 601 of the special light image acquisition section 105 performs a gain-up process on the special light image. Since the special light image is obtained from reflected light of light within a narrow band (i.e., the quantity of light is small), only a small pixel value is obtained. Therefore, the pixel value is multiplied by a given coefficient (gain).

The linking section 106 links the pixel of the normal light image and the pixel of the special light image subjected to the gain-up process. The isolated point determination section 107 performs the isolated point determination process based on the normal light image and the special light image linked to the normal light image.

The correction control section 108 includes the presumption section 201 and the correction section 202. The presumption section 201 presumes the cause of occurrence of the isolated point, and the correction section 202 performs the correction process based on the result of the isolated point determination process performed by the isolated point determination section 107.

For example, the presumption section 201 presumes the cause of occurrence of the isolated point as follows. Specifically, an image is captured in a state in which the light source does not emit light (or the light source emits the maximum quantity of light). In this case, a black (or white) image is acquired. Therefore, a pixel having a small (or large) pixel value is presumed to be a normal pixel.

On the other hand, a pixel having a large (or small) pixel value is presumed to be caused by a defect in the imaging element. In this case, it is presumed that the isolated point has occurred due to the imaging element. Note that the small (or large) pixel value may be the minimum (or maximum) pixel value.

A pixel having a pixel value that differs from those of the peripheral pixels to only a small extent may be determined to be an isolated point due to the gain-up process. Therefore, when the gain used for the gain-up process is larger than a given threshold value, it is presumed that the isolated point has occurred due to the gain-up process.

When it has been determined that the isolated point has occurred due to a reason other than a defect in the imaging element and the gain-up process, the presumption section 201 presumes that the isolated point has mainly occurred due to the object.

The correction process performed by the correction section 202 is described below. The isolated point determination process information obtained by the isolated point determination section 107 and presumption information obtained by the presumption section 201 are input to the correction section 202. The correction section 202 determines whether or not to perform the correction process and the details of the correction process based on the isolated point determination process information and the presumption information.

FIG. 2 shows the correction process performed by the correction section 202. The correction section 202 performs the correction process on the processing target pixel that has been determined to be an isolated point by the isolated point determination process using the normal light image and the special light image irrespective of the presumption by the presumption section 201. Specifically, it is likely that the correction process must be performed on the processing target pixel that has been determined to be an isolated point using the normal light image and the special light image. When the presumption section 201 has presumed that the isolated point has occurred due to a defect in the imaging element or the object, the correction process is performed in the same manner as in the second embodiment (expression (1)). When the presumption section 201 has presumed that the isolated point has occurred due to the gain-up process, a gain-up correction process described later is performed.

When the presumption section 201 has presumed that the isolated point has occurred due to a defect in the imaging element, the correction process is performed by the expression (1) irrespective of the result of the isolated point determination process. Specifically, an isolated point that has occurred due to a defect in the imaging element has a constant value independently of the object, for example. Therefore, such an isolated point must be corrected. Note that the processing target pixel that has not been determined to be an isolated point using the special light image (e.g., C2 and C4 in FIG. 2) need not be corrected. Since the pixel value of the special light processing target pixel that has been determined to be an isolated point due to a defect in the imaging element does not reflect the information about the object, it is desirable to blend (or replace) the pixel value of the special light processing target pixel with the pixel value of the special light peripheral pixel. In this case, the degree of isolation is expected to decrease. Therefore, the blending ratio may be increased to some extent instead of directly using the degree of isolation.

When the presumption section 201 has presumed that the major cause of occurrence of the isolated point is the object, the correction process is not performed unless the processing target pixel has been determined to be an isolated point using the normal light image and the special light image. Specifically, an isolated point that has occurred due to the object reflects the information about the object, and must be allowed to remain.

When the presumption section 201 has presumed that the cause of occurrence of the isolated point is the gain-up process, the gain-up correction process is performed when the processing target pixel has been determined to be an isolated point using the normal light image and the special light image, or when the processing target pixel has been determined to be an isolated point using the special light image although the processing target pixel has not been determined to be an isolated point using the normal light image. Specifically, the correction process is performed when the processing target pixel included in the special light image has been determined to be an isolated point. It is considered that an isolated point that has occurred due to the gain-up process does not fully reflect the information about the object. Therefore, an isolated point that has occurred due to the gain-up process is basically corrected. Since the gain-up correction process suppresses an increment due to the gain-up process (described later), the accuracy of the value may decrease when the correction process is performed on a pixel that is not to be determined to be an isolated point after the gain-up process. Therefore, the correction process is performed on only the processing target pixel that has been determined to be an isolated point using the special light image (i.e., the processing target pixel that should be corrected).

The gain-up correction process performed by the correction section 202 is described below. Specifically, the gain is reduced as the degree of isolation increases. When the blending ratio is referred to as $\gamma$, the corrected pixel value is calculated by the following expression (2).

$$\text{Pixel value of special light processing target pixel}*(1-\gamma)+\text{pixel value of special light processing target pixel/gain}*\gamma \quad (2)$$

The blending ratio $\gamma$ in the expression (2) is set based on the degree of isolation. For example, the degree of isolation may be used as the blending ratio $\gamma$. The value "pixel value of special light processing target pixel/gain" indicates the pixel value before performing the gain-up process. Therefore, the expression (2) blends the pixel values before and after the gain-up process.

It is possible to perform various processes depending on the cause of occurrence of the isolated point by presumption of the presumption section 201, even if the result of the isolated point determination process performed by the isolated point determination section 107 is identical.

4.3 Details of Process

Figure 17:
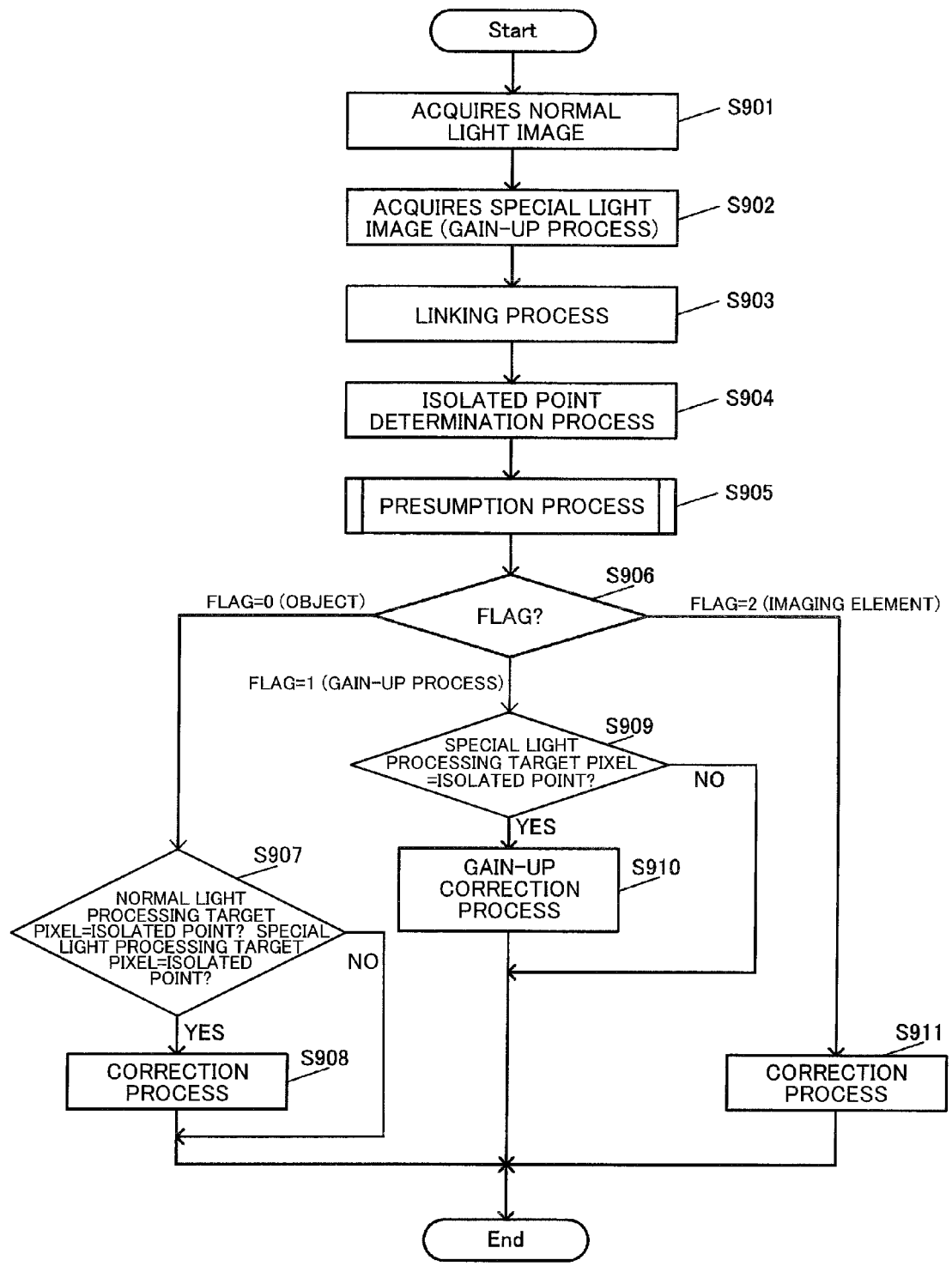
FIG. 17 is a flowchart illustrative of a process according to a third embodiment.

FIG. 17 is a flowchart showing the details of the process performed by the image processing device according to this embodiment. The normal light image acquisition section 104 acquires the normal light image (S901). The special light image acquisition section 105 acquires the special light image (S902).

Figure 18:
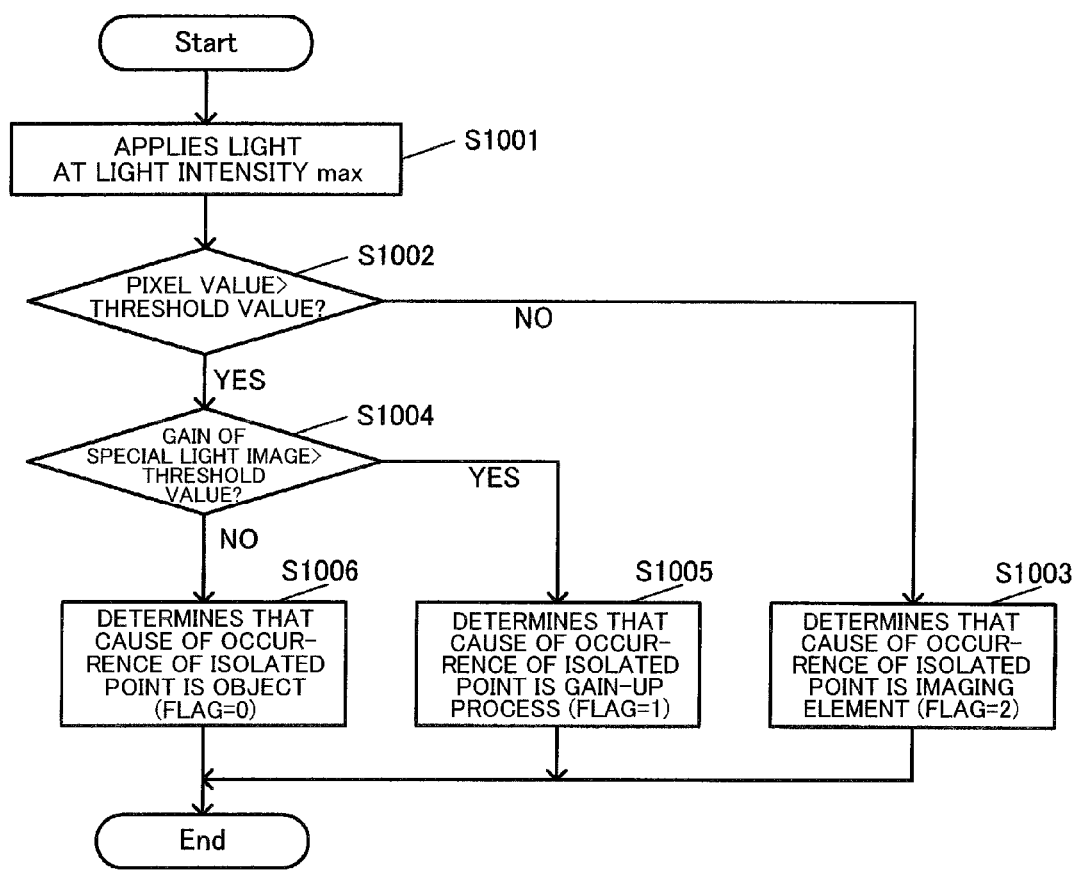
FIG. 18 is a flowchart illustrative of a presumption process.

The linking section 106 then links the pixels of the normal light image and the special light image (S903). The isolated point determination section 107 then performs the isolated point determination process on the normal light processing target pixel and the special light processing target pixel (S904). The presumption section 201 performs the presumption process (described later with reference to FIG. 18) (S905). As shown in FIG. 18, a flag is set to 0 when the cause of occurrence of the isolated point is the object, set to 1 when the cause of occurrence of the isolated point is the gain-up process, and set to 2 when the cause of occurrence of the isolated point is the imaging element.

The flag is then checked (S906). When the flag is 0 (the cause of occurrence of the isolated point is the object), whether or not the normal light processing target pixel is an isolated point is determined, and whether or not the special light processing target pixel is an isolated point is determined (S907). When the normal light processing target pixel is an isolated point, and the special light processing target pixel is an isolated point, the correction process is performed. When the normal light processing target pixel and/or the special light processing target pixel is not an isolated point, the correction process is not performed.

When the flag is 1 (the cause of occurrence of the isolated point is the gain-up process), whether or not the special light processing target pixel is an isolated point is determined (S909). When the special light processing target pixel is an isolated point, the gain-up correction process is performed (S910). When the special light processing target pixel is not an isolated point, the correction process is not performed.

When the flag is 2 (the cause of occurrence of the isolated point is the imaging element), the correction process is necessarily performed (S911).

The details of the presumption process in the step S905 shown in FIG. 17 are described below with reference to FIG. 18. Light is applied at a light intensity max (S1001). Whether or not the pixel value is larger than a given threshold value is then determined (S1002). When the pixel value is smaller than the threshold value, it is determined that the cause of occurrence of the isolated point is the imaging element, and the flag is set to 2 (S1003).

When the pixel value is larger than the threshold value in the step S1002, the gain of the special light image is compared with a given threshold value (S1004). When the gain is larger than the threshold value, it is determined that the cause of occurrence of the isolated point is the gain-up process, and the flag is set to 1 (S1005). When the gain is smaller than the threshold value, it is determined that the cause of occurrence of the isolated point is the object, and the flag is set to 0 (S1006).

According to this embodiment, the correction control section 108 includes the presumption section 201 that presumes the cause of occurrence of the isolated point (see FIG. 15). The correction control section 108 controls the correction process performed on the special light image based on the cause of occurrence of the isolated point presumed by the presumption section 201.

This makes it possible to perform a flexible correction process based on the cause of occurrence of the isolated point, and provide the observer with an excellent special light image.

As shown in FIG. 2, the correction control section 108 does not perform the correction process on the special light processing target pixel when the presumption section 201 has presumed that the cause of occurrence of the isolated point is the object, and it has been determined that at least one of the normal light processing target pixel and the special light processing target pixel is not an isolated point.

Specifically, when the presumption section 201 has presumed that the cause of occurrence of the isolated point is the object, the correction process is not basically performed unless it has been determined that each of the normal light processing target pixel and the special light processing target pixel is an isolated point. Therefore, the information about the object can be allowed to remain as much as possible. The correction process is performed when it has been determined that each of the normal light processing target pixel and the special light processing target pixel is an isolated point. Note that the configuration is not limited thereto. When the presumption accuracy is high, and it has been presumed that the cause of occurrence of the isolated point is the object, the correction process may not be performed irrespective of the isolated point determination process performed on the normal light image and the special light image.

As shown in FIG. 2, when the presumption section 201 has presumed the cause of occurrence of the isolated point is the imaging element, the correction control section 108 performs the correction process on the special light processing target pixel.

Therefore, when it has been presumed that the cause of occurrence of the isolated point is the imaging element, the special light processing target pixel can be corrected irrespective of the isolated point determination process performed on the normal light image and the special light image. Since it is considered that a pixel that has been determined to be an isolated point due to the imaging element does not reflect the information about the object, the pixel should be corrected. Therefore, the above setting is very advantageous.

The image processing device may include the gain-up section, as shown in FIG. 16. The correction control section 108 may perform the correction process on the special light image subjected to the gain-up process, based on the gain-up process.

This makes it possible to perform the gain-up process on the special light image that is normally dark, and then correct the special light image subjected to the gain-up process. In this case, the correction process can be performed based on the gain-up process.

As shown in FIG. 2, the correction control section 108 performs the correction process on the special light processing target pixel based on the gain-up process when the presumption section 201 has presumed that the cause of occurrence of the isolated point is the gain-up process, and it has been determined that the special light processing target pixel is an isolated point.

Specifically, when the presumption section 201 has presumed that the cause of occurrence of the isolated point is the gain-up process, the correction process is performed when the special light processing target pixel is an isolated point. Therefore, it is possible to appropriately correct the special light processing target pixel that has become an isolated point due to the gain-up process. The correction process performed based on the gain-up process may be a process that replaces the pixel value of the special light processing target pixel subjected to the gain-up process with the pixel value of the special light processing target pixel before being subjected to the gain-up process, for example. When the degree of isolation can be calculated in the same manner as in the second embodiment, the blending process indicated by the expression (2) may be performed.

The presumption section may presume that the cause of occurrence of the isolated point is the imaging element when the pixel value of the special light processing target pixel that has been determined to be the isolated point has the maximum luminance or the minimum luminance. The correction control section 108 reduces the pixel value of the special light processing target pixel when the special light processing target pixel has the maximum luminance, and increases the pixel value of the special light processing target pixel when the special light processing target pixel has the minimum luminance.

Specifically, the correction process is performed on a pixel having the maximum or minimum luminance (1023 or 0 (10 bits)) on the assumption that the pixel has an abnormal value (over or under exposure). More specifically, the pixel value is reduced when over exposure has occurred, and is increased when under exposure has occurred.

The first to third embodiments according to the invention and the modifications thereof have been described above. Note that the invention is not limited to the first and to third embodiments and the modifications thereof. Various modifications and variations may be made without departing from the scope of the invention. A plurality of elements of each of the first to third embodiments and the modifications thereof may be appropriately combined. For example, an arbitrary element may be omitted from the first to third embodiments and the modifications thereof. Some of the elements described in connection with the first to third embodiments and the modifications thereof may be appropriately combined. Specifically, various modifications and applications are possible without materially departing from the novel teachings and advantages of the invention.

What is claimed is:

1. An image processing device comprising:
   a normal light image acquisition section that acquires a normal light image including an object image that includes information within a wavelength band of white light;
   a special light image acquisition section that acquires a special light image including an object image that includes information within a specific wavelength band;
   an isolated point determination section that performs an isolated point determination process on a normal light processing target pixel based on a pixel value of the normal light processing target pixel, the normal light processing target pixel being a processing target pixel included in the normal light image; and
   a correction control section that controls a correction process performed on the special light image based on the isolated point determination process performed by the isolated point determination section.

2. The image processing device as defined in claim 1,
   the isolated point determination section performing the isolated point determination process on the normal light processing target pixel based on the pixel value of the normal light processing target pixel and a pixel value of another pixel.

3. The image processing device as defined in claim 2,
   the another pixel being a normal light peripheral pixel that is positioned around the normal light processing target pixel.

4. The image processing device as defined in claim 3,
   the isolated point determination section determining that the normal light processing target pixel is an isolated point when the absolute value of a difference between a value calculated from the pixel value of the normal light peripheral pixel and the pixel value of the normal light processing target pixel is larger than a given threshold value.

5. The image processing device as defined in claim 1, further comprising:
   a linking section that links the normal light processing target pixel and a special light processing target pixel based on the normal light image and the special light image, the special light processing target pixel being a pixel that is included in the special light image and corresponds to the normal light processing target pixel,
   the correction control section correcting the special light processing target pixel corresponding to the normal light processing target pixel that has been determined to be an isolated point by the isolated point determination section.

6. The image processing device as defined in claim 5,
   the correction control section replacing a pixel value of the special light processing target pixel with a value calculated from a pixel value of a special light peripheral pixel that is positioned around the special light processing target pixel.

7. The image processing device as defined in claim 5,
   the isolated point determination section performing the isolated point determination process on the special light processing target pixel based on a pixel value of the special light processing target pixel and a pixel value of a special light peripheral pixel that is positioned around the special light processing target pixel.

8. The image processing device as defined in claim 7,
   the correction control section correcting the special light processing target pixel when the isolated point determination section has determined that the normal light processing target pixel included in the normal light image is the isolated point, and determined that the special light processing target pixel that is included in the special light image and corresponds to the normal light processing target pixel is the isolated point.

9. The image processing device as defined in claim 5,
   the correction control section including a presumption section that presumes a cause of occurrence of the isolated point included in the special light image, the correction control section controlling the correction process performed on the special light image based on the cause of occurrence of the isolated point presumed by the presumption section.

10. The image processing device as defined in claim 9,
    the correction control section not correcting the special light processing target pixel when the presumption section has presumed that the cause of occurrence of the isolated point is an object captured within the special light image, and the isolated point determination section has determined that at least one of the normal light processing target pixel included in the normal light image and the special light processing target pixel included in the special light image is not the isolated point.

11. The image processing device as defined in claim 9,
the correction control section correcting the special light processing target pixel when the presumption section has presumed that the cause of occurrence of the isolated point is an imaging element used to capture the special light image.

12. The image processing device as defined in claim 9, further comprising:
a gain-up section that performs a gain-up process that uniformly increases a pixel value of each pixel included in the special light image by a given gain,
the correction control section correcting the special light processing target pixel based on the gain-up process performed by the gain-up section.

13. The image processing device as defined in claim 12,
the correction control section correcting the special light processing target pixel based on the gain-up process performed by the gain-up section when the presumption section has presumed that the cause of occurrence of the isolated point is the gain-up process performed by the gain-up section, and the isolated point determination section has determined that the special light processing target pixel that is included in the special light image and corresponds to the normal light processing target pixel is the isolated point.

14. The image processing device as defined in claim 9,
the presumption section presuming that the cause of occurrence of the isolated point is an imaging element used to capture the special light image when the pixel value of the special light processing target pixel that has been determined to be the isolated point has a maximum luminance or a minimum luminance.

15. The image processing device as defined in claim 14,
the correction control section reducing the pixel value of the special light processing target pixel when the pixel value of the special light processing target pixel that has been determined to be the isolated point has the maximum luminance.

16. The image processing device as defined in claim 14,
the correction control section increasing the pixel value of the special light processing target pixel when the pixel value of the special light processing target pixel that has been determined to be the isolated point has the minimum luminance.

17. The image processing device as defined in claim 1,
the isolated point determination section acquiring isolated point determination information that indicates a result of the isolated point determination process.

18. The image processing device as defined in claim 17,
the isolated point determination section acquiring a degree of isolation of the normal light processing target pixel as the isolated point determination information based on the normal light processing target pixel and a value calculated from a normal light peripheral pixel that is positioned around the normal light processing target pixel; and
the correction control section controlling the correction process on the special light image based on the degree of isolation of the normal light processing target pixel.

19. The image processing device as defined in claim 18,
the isolated point determination section acquiring a degree of divergence of the normal light processing target pixel from a value calculated from the normal light peripheral pixel as the degree of isolation.

20. The image processing device as defined in claim 19, further comprising:
a linking section that links the normal light processing target pixel and a special light processing target pixel based on the normal light image and the special light image, the special light processing target pixel being a pixel that is included in the special light image and corresponds to the normal light processing target pixel,
the correction control section setting a blending ratio of a given value calculated from a pixel value of a special light peripheral pixel that is positioned around the special light processing target pixel and a pixel value of the special light processing target pixel before correction based on the degree of isolation of the normal light processing target pixel, and correcting the pixel value of the special light processing target pixel by blending the given value and the pixel value of the special light processing target pixel before correction based on the blending ratio.

21. The image processing device as defined in claim 20,
the given value being a value corresponding to at least one of an average value and a median value of the pixel values of a plurality of the special light peripheral pixels.

22. The image processing device as defined in claim 20,
the correction control section decreasing the blending ratio of the special light processing target pixel as the degree of isolation of the normal light processing target pixel increases.

23. The image processing device as defined in claim 19, further comprising:
a gain-up section that performs a gain-up process that uniformly increases a pixel value of each pixel included in the special light image by a given gain,
the correction control section correcting a pixel value of a special light processing target pixel that is included in the special light image subjected to the gain-up process and corresponds to the normal light processing target pixel based on the degree of isolation of the normal light processing target pixel.

24. The image processing device as defined in claim 23, further comprising:
a linking section that links the normal light processing target pixel and a special light processing target pixel based on the normal light image and the special light image, the special light processing target pixel being a pixel that is included in the special light image and corresponds to the normal light processing target pixel,
the correction control section setting a blending ratio of a given value calculated from an increment due to the gain-up process on the special light processing target pixel and a pixel value of the special light processing target pixel before correction based on the degree of isolation of the normal light processing target pixel, and correcting the pixel value of the special light processing target pixel by blending the given value and the pixel value of the special light processing target pixel before correction based on the blending ratio.

25. The image processing device as defined in claim 1,
the specific wavelength band being narrower than the wavelength band of the white light.

26. The image processing device as defined in claim 25,
each of the normal light image and the special light image being an in vivo image; and
the specific wavelength band included in the in vivo image being a wavelength band of light absorbed by hemoglobin in blood.

27. The image processing device as defined in claim 26,
the specific wavelength band being 390 to 445 nm or 530 to 550 nm.

28. The image processing device as defined in claim 1, the special light image being an in vivo image; and the specific wavelength band included in the in vivo image being a wavelength band of fluorescence emitted from a fluorescent substance.

29. The image processing device as defined in claim 28, the specific wavelength band being 490 to 625 nm.

30. The image processing device as defined in claim 1, the special light image being an in vivo image; and the specific wavelength band included in the in vivo image being a wavelength band of infrared light.

31. The image processing device as defined in claim 30, the specific wavelength band being 790 to 820 nm or 905 to 970 nm.

32. An information storage device storing a program that causes a computer to function as:

a normal light image acquisition section that acquires a normal light image including an object image that includes information within a wavelength band of white light;

a special light image acquisition section that acquires a special light image including an object image that includes information within a specific wavelength band;

an isolated point determination section that performs an isolated point determination process on a normal light processing target pixel based on a pixel value of the normal light processing target pixel, the normal light processing target pixel being a processing target pixel included in the normal light image; and a correction control section that controls a correction process performed on the special light image based on the isolated point determination process performed by the isolated point determination section.

* * * * *